United States Patent

[11] 3,565,335

[72] Inventor Donald L. Holden
 Des Plaines, Ill.
[21] Appl. No. 734,338
[22] Filed June 4, 1968
[45] Patented Feb. 23, 1971
[73] Assignee Universal Oil Products Company
 Des Plaines, Ill.

[54] DEVICE FOR CALCULATING QUANTITIVE COMPOSITION OF A SUBSTANCE FROM AN X-RAY SPECTROSCOPIC ANALYSIS
5 Claims, 4 Drawing Figs.

[52] U.S. Cl. ............................................. 235/70
[51] Int. Cl. .............................................. G06g 1/02
[50] Field of Search ................................. 235/70, 70.1, 78, 88, 79.5, 89

[56] References Cited
UNITED STATES PATENTS

| | | | |
|---|---|---|---|
| 1,609,972 | 12/1926 | Sherrer et al. | 235/70 |
| 2,455,522 | 12/1948 | Ringler | 235/70X |
| 2,773,415 | 12/1956 | Wolfe | 235/70X |
| 3,162,363 | 12/1964 | Lavie | 235/70 |
| 3,282,500 | 11/1966 | Pikus | 235/70 |

FOREIGN PATENTS

| | | | |
|---|---|---|---|
| 859,063 | 1/1961 | Great Britain | 235/70 |

Primary Examiner—Richard B. Wilkinson
Assistant Examiner—Stanley A. Wal
Attorneys—James R. Hoatson, Jr. and Philip T. Liggett ABSTRACT: Two graduated scales, relatively positionable, for making analogue computations of the quantity of a known material in a qualitatively known and quantitatively unknown composition. One scale is calibrated in weight percentages and graduated according to a mathematical function of weight percentages. A second scale is calibrated in units proportional to intensity measurements from an X-ray spectroscopic analysis, and is graduated identically with the first scale.

PATENTED FEB 23 1971

INVENTOR:
Donald L. Holden

BY:
James R. Hoalson, Jr.
Philip T. Liggett
ATTORNEYS

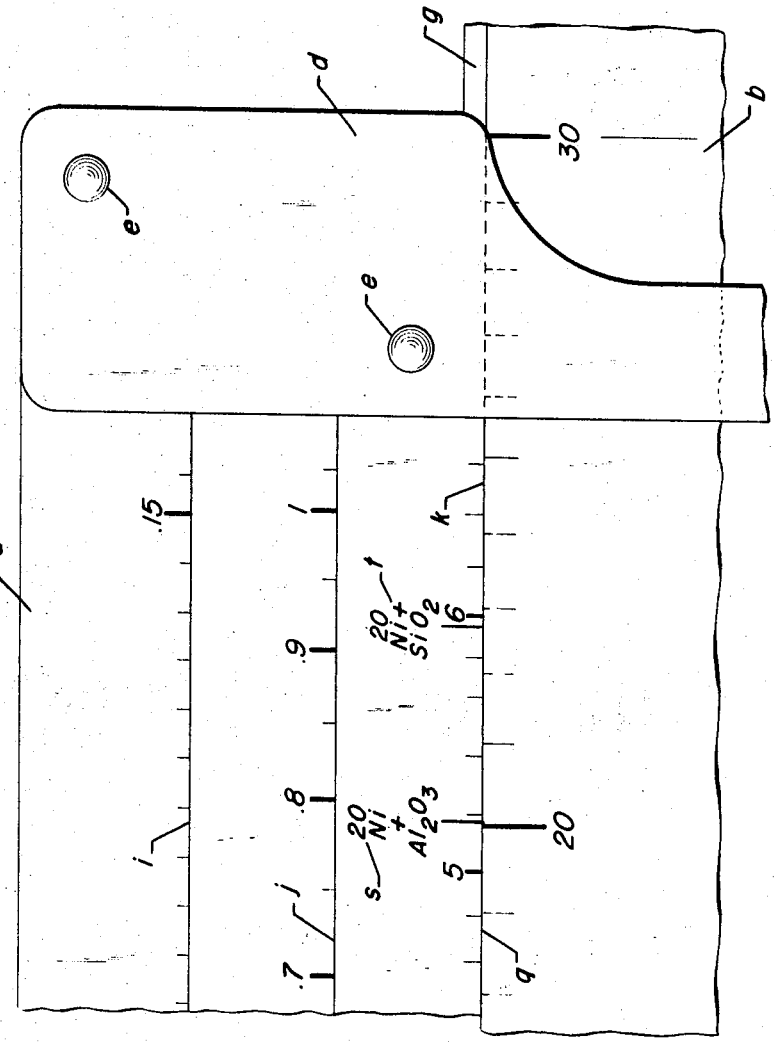

DEVICE FOR CALCULATING QUANTITIVE COMPOSITION OF A SUBSTANCE FROM AN X-RAY SPECTROSCOPIC ANALYSIS

This invention relates to a device for calculating the quantity of a material in a composition from an x-ray spectroscopic analysis. More particularly, this invention comprises two, relatively positionable calibrated scales for making analogue computations of the quantity of a known material in a qualitatively known and quantitatively unknown composition. One scale is calibrated in weight percentages and graduated or scaled according to a mathematical function of weight percentages. A second scale is calibrated in units proportional to intensity measurement from an X-ray spectroscopic analysis, and graduated or scaled identically with the first scale.

Heretofore, in deriving the weight percentages of a composite substance from the intensity readings of an X-ray spectroscopic analysis, it has been necessary to make arduous and time consuming arithmetic and algebraic calculations. Besides being vulnerable to manually produced arithmetic errors, the results of such computations are difficult to compare for different individuals, and for different spectroscopically analyzed substances, even when the computations are performed by the same individual. This is due to the varying mathematical accuracy of the different methods of computating weight percentages from intensity readings of an X-ray spectroscopic analysis, and to the varying accuracy of the different formulations used to arrive at the results for the different substances analyzed.

It is an object of this invention to eliminate virtually all arithmetic and algebraic errors in computing weight percentages from an X-ray spectroscopic analysis. The only source of such an error in using the present invention would be in positioning the scales with respect to each other, or by incorrectly reading figures from the scales. Even if such an error were to occur using this invention, rechecking for such an error is immensely simplified.

It is a further object of this invention to obtain much more consistent results than are obtained from manual computations. This advantage is realized in that with this invention the same mathematical formulation underlies each result obtained. There is no variation in the degree of accuracy, depending upon individual peculiarities in computation, nor is there any variation in consistency between readings, since variations arising from rounding off figures or from the use of different mathematical methods of arriving at a solution are eliminated. The present invention is appropriate for use wherever it is desired to determine the percentages by weight of a given material from the X-ray spectroscopic analysis of a qualitatively known, but quantitatively unknown chemical composition. Thus, this invention will find a widespread application in the quality control of products where the chemical composition is sufficiently critical to warrant an X-ray spectroscopic analysis to insure that the quantities of different materials in such a product stay within certain limits. One such area of application is in the field of catalyst production. Another area of use is in the refining of metals and the productions of steel and other metal alloys, particularly where additives are used to enhance certain properties. Other appropriate areas are in electroplating and in refining and blending petroleum products.

In a broad aspect this invention is a device for calculating the quantity of a known material, in a substance having a known qualitative and an unknown quantitative chemical composition, from the intensity measurement of an X-ray spectroscopic analysis of said substance, comprising two relatively movable members, the first of said members having scales calibrated in weight percentages and scaled according to the logarithm of the quotient of said weight percentage divided by 100 minus said weight percentage, and the second of said members having scales calibrated in values directly proportional to said intensity measurement and scaled identically with the scales of said first member, and reference values for a chemical composition qualitatively identical to the aforesaid substance are indicated on at least one of said scales of said members, whereby the scales of the aforesaid members are alignable according to said reference values, and the percentage composition for the aforesaid known material is determinable from the value directly proportional to intensity measurement for the aforesaid substance.

In an X-ray spectroscopic analysis, the substance, or sample to be analyzed is mounted in a sample cup or cell and is bombarded with polychromatic X-rays or X-rays of a given wave length. In the procedure described, the samples are considered to be "infinitely thick" to X-rays. The actual sample thickness of one-fourth to one-half inch is such as to allow less than 1 percent of the total X-rays to completely penetrate the sample. Upon striking the substance, the exciting X-rays displace electrons from the inner orbitals of the molecules comprising the substance. As these vacancies are filled with other electrons, energy in the form of X-rays, characteristic of the particular molecule are emitted. This polychromatic radiation from the sample is resolved by using a single crystal such as lithium fluoride for a grating. Each characteristic X-ray line therefore appears at its expected position on the goniometer circle where it may be detected and measured in intensity by a proportional, or scintillation, or other counter. Normally, the elements comprising the substance analyzed are known prior to the spectroscopic analysis. The spectroscopic analysis is conducted for the purpose of making quantitative determinations of one or more of the elements present in a substance. The quantity of an element present can be determined from the intensity of one of its characteristic X-ray lines. Where the concentration for a particular element is less than about 0.3 percent, the concentration is usually directly proportional to the intensity of the characteristic X-ray line for that element. Where concentration of an element increases beyond 0.3 percent, the absorption effects of this element and the other elements increasingly affect the intensity of the reflected X-rays. The effect of this absorption can be seen from the equation which may be used to compute weight percentage for a specific element while correcting for the absorption effects. This equation may be expressed as follows for samples which may be considered infinitely thick:

$$C = \frac{a_2 C_2 + a_3 C_3 \ldots}{\frac{I_p}{I} - 1}$$

where $C$ is the weight percentage to be calculated of an element; $C_2$, $C_3$, etc., are the weight percentages of the other elements of the substance (the sample matrix); and $a_2$, $a_3$, etc., are the ratios of the X-ray mass absorption coefficient of the other elements to that of the element being calculated. $I_p$ is the intensity of the characteristic X-ray line from the pure element for which the weight percentage is being sought. $I$ is the measured intensity for the substance analyzed. In the above expressions, the products of the absorption ratios and the weight percentages of the other elements can be combined to form another expression:

$$C = \frac{A(100 - C)}{\frac{I_p}{I} - 1}$$

In this expression, $A$ is the effective absorption coefficient of the matrix or other elements. The word "effective" is used to describe $A$ since the true value of $A$ may not always be equal to the summation of the individual absorption coefficients, due to the enhancing effect of certain elements in the substance analyzed. These effects may change the value of $A$ somewhat, for different concentrations of the material being analyzed. For this reason, the selection of appropriate reference values on the scales, as will be described herein, is important.

The aforesaid equation may be further modified by rearranging the equation and substituting the term R, which is equal to $I \times 100/I_p$, in the rearranged equation thus forming the expression:

$$\frac{C}{100 - C} = A\left(\frac{R}{100 - R}\right)$$

which can be expressed as $$\log\left(\frac{C}{100-C}\right) = \log\left(\frac{R}{100-R}\right) + \log A.$$

It can be seen that the logarithms of the function of weight percentage and intensity differ only by log $A$. If alignable scales are graduated or scaled according to the logarithms of the two functions, that is, if the scales are calibrated according to the variables and if a set or corresponding values of the two functions is known as a reference, either variable can be determined from the scales, when the other variable is given. The present invention utilizes this relationship to facilitate the computation of weight concentration when the variable $R$, as derived from the intensity measurement of the X-ray spectroscopic analysis, is known.

The present invention has a first member, with scales graduated according to the values of the logarithm of the aforesaid function of weight percentage, and calibrated according to the variable itself. That is, the scales are linearly disposed according to the values of the logarithm of the function $C/(100-)$, and the values of $C$ are indicated at appropriate points on the scales. This invention also has a second member with the scales graduated according to the logarithm of the aforesaid function of intensity, that is, according to the logarithm of the function $R/(100-)$. The values of $R$ are indicated at the appropriate points on the scales on this second member. Since the two functions involved are mathematically identical except for the variables $R$ and $C$ scaling of said first member will be identical to that of said second member, thus the distance between two numerical values of the variable on one scale will equal the distance between the same numerical values of the variable on the other scale.

To facilitate computations, proper alignment of the scales must be accomplished with relative ease. One manner of obtaining this result is through exterior tables of reference values, that is, corresponding values of the variables from previous calculations obtained from X-ray spectroscopic analyses of standards comprised of the same elements as are the quantitatively unknown substances under investigation. For example, where previously a standard of silica and nickel has undergone an X-ray spectroscopic analysis, it can be determined that for a known nickel concentration of 5.95 percent an intensity will be obtained such that $R$ is equal to 20. In determining the nickel concentration in future samples consisting of silica and nickel, the scales need merely be aligned so that the value of $C$ (5.95) on the scales of the first member is directly opposite the value of $R$ (20) on the scales of the second member. The nickel concentration in each future sample need merely be read from the scales of the first member opposite the new values of $R$ on the scales of the second member. As previously noted, it is preferable to choose the reference values used as near as possible to the concentrations being determined. In this manner, errors from variations in the absorption coefficient are minimized due to alteration of the matrix, since changes are negligible over small ranges of composition. An unusual sample having a wide deviation in concentrations from the normal should receive special treatment to reduce possible inaccuracies, since the effective absorption coefficient of its matrix may be materially different from that of the normal sample. Such special treatment may include diluting the sample with a standard matrix such as silica or water, or applying mathematical corrections to the absorption coefficient of the matrix using literature values of mass absorption coefficients.

Rather than using exterior tables for reference values, it is often practical, when X-ray spectroscopic analyses are frequently performed on substances containing the same elements, to conspicuously indicate the reference values of the variables on the scales themselves. Referencing the scales in this manner performs the same function as do exterior tables of reference values. In both cases, alignment of the members of this invention for calculating the quantity of known materials in substances analyzed is accomplished.

The inscribed calibrations on each member may all be made on a single scale, or they may be divided into as many scales as desired, depending upon the accuracy desired and the physical length to which it is desired to limit any one member.

The preferred embodiment of this invention is constructed much the same as is a common bar slide rule. In this embodiment, the scales of percent concentration are parallel to each other along the length of a first member, which is comprised of two parallel components, and of transverse braces which fasten the ends of said parallel components together, said components having tracks on their inner edges to engage and linearly restrain a second member. Said second member is comprised of a single component having complimentary lips to engage the tracks of said first member. Said second member fits slideably between the components of said first member so that the two members are always parallel and are slideably alignable. The reading of corresponding values from the scales may be further facilitated by the addition of a transparent third member containing a crosshair perpendicular to the scales on the first and second members, and which fits slideably around the aforesaid first and second members. The crosshair may be centered on the appropriate value of the function of intensity, and the crosshair will then define the corresponding percent concentration. The scales of said first and second members may be on one side, or on both sides of their respective members.

Another embodiment of this invention has a construction similar to that of a disc slide rule. In this instance the first member is a planar disc and the second member is a smaller planar disc, both discs being mounted together about the same axis, both discs having the aforesaid scales in the form of concentric circles inscribed thereon, the smallest concentric circle of said first disc having a greater diameter than the diameter of said second member. The incorporation of a transparent third member mounted about the same axis and having a radial crosshair to facilitate alignment, is also appropriate to this embodiment.

Another embodiment of this invention is a construction similar to that of a cylindrical slide rule, wherein the first member is a cylinder with retaining means on its ends, and said second member is an annular sleeve, fitting slideably around said first member and retained on said first member by the aforesaid retaining means, and the aforesaid scales are inscribed in the form of rings about the respective members and are spaced parallel along the surfaces of the respective members.

The simplest of all embodiments is where said first member is substantially a planar surface with scales extending lengthwise on the surface of said first member and said second member is further comprised of an elongated single component with the aforesaid calibrations on said scales of said second member inscribed on all sides and on all linear edges parallel to the length of said component. In this case, the planar surface may merely be a sheet of paper. This embodiment is of particular advantage when the X-ray spectroscopic analyses are performed on a number of substances made up of different elements, since a number of different sheets of paper with percentage concentrations scales can be used with appropriate reference values thereon. This avoids placing a large number of reference marks on a single concentration scale or on a single sheet of paper. In this manner, the second member will have no reference marks on it, while the various sheets of paper have indicated reference percentage concentrations and also references to the corresponding readings on the second member, for each substance analyzed.

The various features of the preferred embodiment of this invention are further illustrated in the accompanying drawings in which:

FIG. 3 is an end view of the preferred embodiment; and

FIG. 4 is an enlarged view of the upper right-hand portion of the surfaces of adjacent first and second members in FIG. 2.

Figure 1:
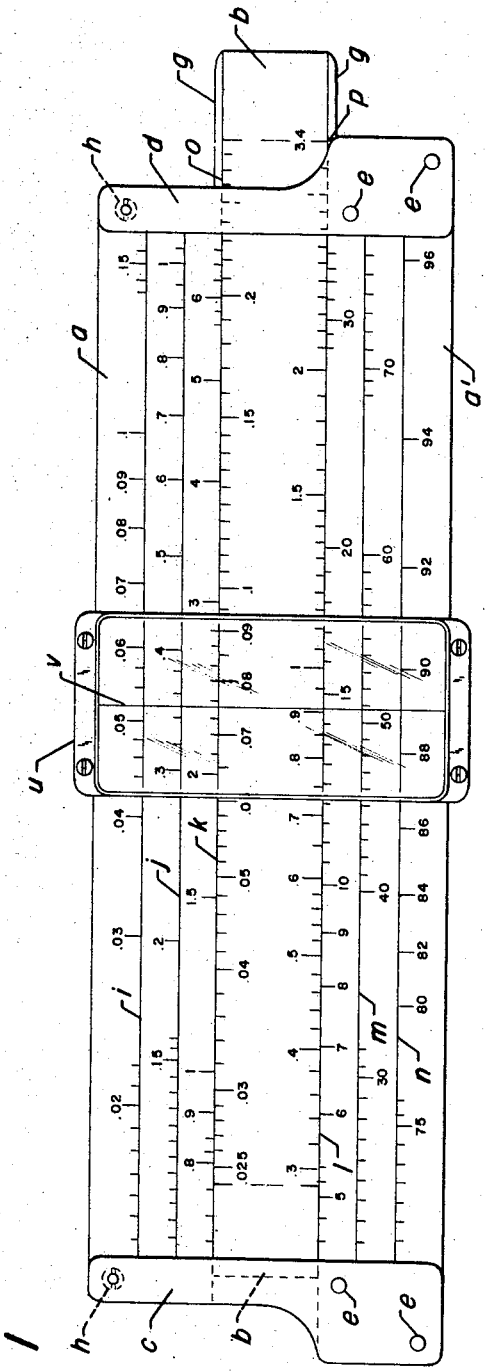
FIG. 1 is a view of the front surface of the preferred embodiment of this invention.
Figure 2:
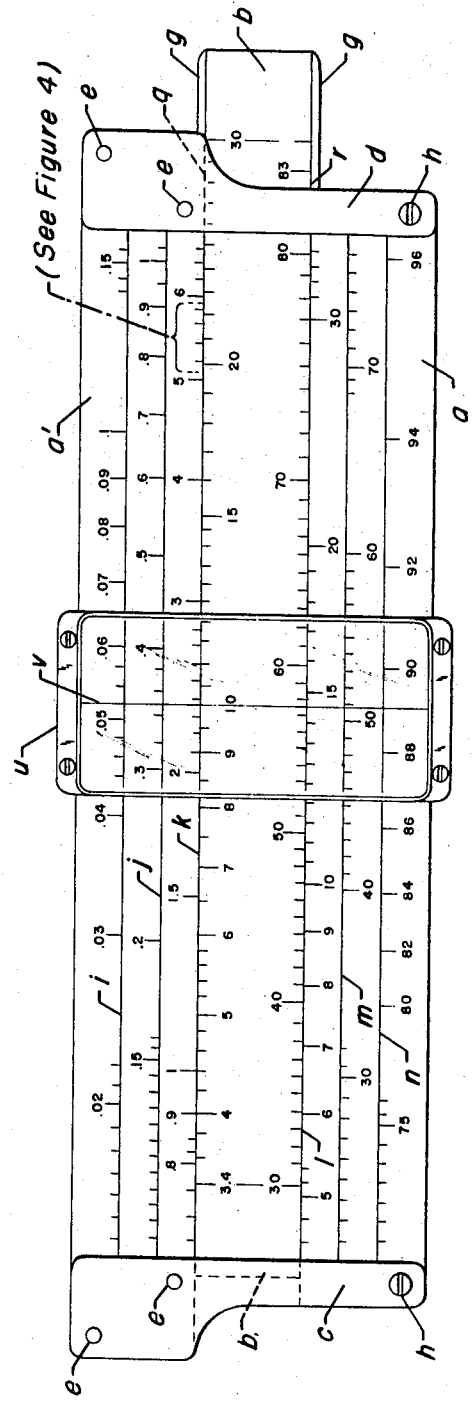
FIG. 2 is a view of the rear surface of the preferred embodiment of this invention.

Referring now to the drawings, $a$ and $a'$ are two parallel components of a first member of the invention. Transverse braces $c$ and $d$ fasten the ends of components $a$ and $a'$ together. Screws $h$ fasten the braces to component $a$ and rivets $e$ fasten the braces to component $a'$. Components $a$ and $a'$ each have a track $f$ on their inner edges to engage and linearly restrain a second member $b$. The second member is comprised of a single component $b$ which has lips $g$ on each of its outside edges. Lips $g$ are complementary to and engage tracks $f$, whereby member $b$ fits slideably between components $a$ and $a'$. A transparent third member $u$ fits slideably around the components $a$ and $a'$, thereby enclosing member $b$. Thus, member $b$ slides along tracks $f$ on the inside edges of components $a$ and $a'$ parallel to components $a$ and $a'$, and third member $u$ slides along the outside of and parallel to components $a$ and $a'$. Third number $u$ has a crosshair $v$ which is perpendicular to the direction of movement of the third member $u$ and which is also perpendicular to the scales on components $a$ and $a'$.

Duplicate scales $i$ are located near the outside edges of the front of component $a$ and the rear, or back of component $a'$. Duplicate scales $k$ are on the inside edge of the front of component $a$ and on the inside edge of the back of component $a'$. Duplicate scales $j$ are parallel to and located between scales $i$ and $k$, both on the front of component $a$ and on the back of component $a'$. Duplicate scales $n$ are near the outside edge of the front of component $a'$ and the outside edge of the back of component $a$. Duplicate scales $l$ are on the inside edge of the front of component $a'$ and the inside edge of the back of component $a$. Duplicate scales $m$ are parallel to and located between scales $l$ and $n$, both on the front of component of $a'$ and on the back of component $a$. Thus, two complete sets of scales $i$, $j$, $k$, $l$, $m$, and $n$ exist, one on the front of said first member and one on the rear of said first member. While duplicate scales on said first member are not essential to the operation of this invention, they facilitate alignment of said first member with said second member.

The set of scales $i$, $j$, $k$, $l$, $m$, and $n$ on the front of the first member and the duplicate set of scales $i$, $j$, $k$, $l$, $m$, and $n$ on the back of the first member are graduated according to the logarithm of the function $C/(100-)$ and are calibrated according to values of $C$, where $C$ is the weight percentage. Together each set of scales covers the range of values of the function of $C$ from $C$ equals 0.012 to $C$ equals 96. Since the logarithm of this function approaches infinity as $C$ increases, it is not possible to cover the entire range of the function. Each scale $i$ is calibrated from $C$ equals 0.012 to $C$ equals 0.15, and each scale $j$ is calibrated from $C$ equals 0.15 to $C$ equals 1. Each scale $k$ is calibrated from $C$ equals 0.8 to $C$ equals 6, while each scale $l$ is calibrated from $C$ equals 5 to $C$ equals 30. Each scale $m$ is calibrated from $C$ equals 30 to $C$ equals 75, and each scale $n$ is calibrated from $C$ equals 75 to $C$ equals 96.

On the front of member $b$ are two scales. Scale $o$ is on the front of member $b$ at the edge adjacent to scale $k$ on component $a$, and scale $p$ is on the front of component $b$ at the edge adjacent to scale $l$ on component $a'$. Scale $q$ is on the rear of member $b$ at the edge adjacent to scale $k$ on component $a'$, while scale $r$ is on the rear of member $b$ at the edge adjacent to scale $l$ on component $a$. These scales, $o$, $p$, $q$, and $r$, are not duplicated on member $b$ as are the scales on components $a$ and $a'$. Scales $o$, $p$, $q$, and $r$, are graduated according to the logarithm of the function $R/(100-)$, and are calibrated according to values of $R$. Together these scales cover the range of values of the function of $R$ from 0.25 to 83. Since the logarithm of this function approaches infinity as $R$ increases, and negative infinity as $R$ decreases, it is not possible to cover the entire range of the function. Scale $o$ is calibrated from $R$ equals 0.025 to $R$ equals 0.29, and scale $p$ is calibrated from $R$ equals 0.29 to $R$ equals 3.4. Scale $q$ is calibrated from $R$ equals 3.4 to $R$ equals 30, while scale $r$ is calibrated from $R$ equals 30 to $R$ equals 83.

It can be seen that if corresponding reference values are known for $R$, the function of intensity, and for $C$, the weight percentage concentration, for a substance comprised of particular elements, the weight percentage concentration can be easily found from the measured intensity for any subsequent samples analyzed by X-ray spectroscopy, where the samples contain the same elements as the aforesaid substance. As illustrated in FIG. 4, corresponding reference values are conspicuously indicated on the scales of the invention for substances which are frequently analyzed by X-ray spectroscopy. Reference values for a substance comprised of nickel and alumina ($Al_2O_3$) and for a substance comprised of nickel and silica ($SiO_2$) are inscribed at $s$ and $p$ respectively. At $s$, a reference point for weight concentration of nickel in alumina, the corresponding reference value for $R$, the function of intensity, is indicated. This value, as illustrated, is 20, and is followed by the composition of the substance, $Ni + Al_2O_3$, and a line leading to the reference point for weight concentration on the scales of components $a$ and $a'$. This reference point is 5.15 on scale $k$ on component $a'$. At $t$, a reference point for weight concentration of nickel in silica, the corresponding reference value for $R$, the function of intensity, is indicated. As illustrated, this value is 20, and is followed by the composition of the substance, $Ni + SiO_2$, and a line leading to the reference point for weight concentration on the scales of components $a$ and $a'$. This reference point is 5.95 on scale $k$ on component $a'$.

If it is desired to determine the weight percentage of nickel in a subsequent sample of nickel in alumina, where the computed value of $R$, according to the definition of $R$, is 10, is aligned with components $a$ and $a'$ according to the reference values for nickel and alumina. That is, scale $k$, at $C$ equals 5.15, is positioned opposite scale $q$ at $R$ equals 20. Crosshair $v$ is aligned along member $b$ at the point on scale $q$ where $R$ equals 10, and the weight percentage of nickel can be determined from the intersection of crosshair $v$ with scale $k$ on component $a'$. More specifically, as illustrated, the weight percentage for a sample of nickel in alumina having a value of $R$ equal to 10, is 2.33.

The embodiment as illustrated in the drawings is not to be construed as limiting the different devices upon which the aforesaid scales can be placed. Although possible devices which may serve as the physical embodiments of this invention include those means which are commonly employed in slide rules, this invention is not to be considered limited thereto.

I claim:

1. A device for calculating the quantity of a known material, in a substance having a known qualitative and unknown quantitative chemical composition, from the intensity measurement of an X-ray spectroscopic analysis of said substance, comprising two relatively movable members, the first of said members having a plurality of parallel scales disposed thereon calibrated in weight percentages and scaled according to the logarithm of the quotient of said weight percentage divided by 100 minus said weight percentage, each one of said plurality of scales on said first member covering a distinct predetermined range of values of said weight percentages, and the second of said members having a plurality of parallel scales disposed thereon calibrated in values directly proportional to said intensity measurement and scaled with the distances between values on the scales of said second member equal to the distances between the same values on the scales of said first member, each one of said plurality of scales on said second member covering a distinct predetermined range of values of said intensity measurements, and reference values for a chemical composition qualitatively identical to the aforesaid substance are indicated on at least one of said scales of said members, whereby the scales of the aforesaid members are alignable according to said reference values, and the percentage composition for the aforesaid known material is determinable from the value directly proportional to intensity measurement for the aforesaid substance.

2. The apparatus of claim 1 further characterized in that corresponding reference values are conspicuously indicated on said scales for substances which are frequently analyzed by X-ray spectroscopy, thereby facilitating alignment of said members for calculating the quantity of known materials in said substance.

3. The apparatus of claim 1 further characterized in that the calibration of percentages on said scales of said first member covers the range of values from 0.012 to 96 and the calibration of intensity measurements on said scales of said second member covers the range of values from 0.025 to 83.

4. The apparatus of claim 4 further characterized in that said first member is further comprised of two parallel components, and transverse braces which fasten the ends of said parallel components together, said components having tracks on their inner edges to engage and linearly restrain said second member; said second member is further comprised of a single component having complementary lips to engage the tracks of said first member, and fitting slideably between the components of said first member, and in addition a transparent third member containing a crosshair perpendicular to the scales of said first and second members, fits slideably around the aforesaid first and second members.

5. The apparatus of claim 1 further characterized in that said first member is substantially a planar surface with said scales extending lengthwise on the surface of said first member and said second member is further comprised of an elongated single component with the aforesaid calibrations on said scales of said second member inscribed on all sides and on all linear edges parallel to the length of said component.